July 16, 1940. A. G. GURRIES 2,208,526
COMBINATION LEVELER AND CHECKER
Filed April 19, 1939 3 Sheets-Sheet 1

INVENTOR
*A.G.Gurries*

ATTORNEY

July 16, 1940. A. G. GURRIES 2,208,526
COMBINATION LEVELER AND CHECKER
Filed April 19, 1939 3 Sheets-Sheet 3

INVENTOR
A. G. Gurries
BY
ATTORNEY

Patented July 16, 1940

2,208,526

UNITED STATES PATENT OFFICE 2,208,526

COMBINATION LEVELER AND CHECKER

Albert G. Gurries, Gilroy, Calif., assignor to Be-Ge Manufacturing Company, Gilroy, Calif., a co-partnership comprising Albert G. Gurries and James A. Bussert Application April 19, 1939, Serial No. 268,739

6 Claims. (Cl. 37—169)

This invention relates to ground working implements, and particularly to ground leveling or check and border forming implements.

When leveling ground, it is necessary that the supporting wheels of the leveler blade unit shall be behind and disposed in planes inwardly of the side edges of the blade, in order that the wheels will rest at the level of the blade. On the other hand, for check or border forming purposes, the wheels must lie in planes outwardly of the side edges of the blade, so that the wheels will not pass over and cut into a formed check.

Due to these essential differences in wheel arrangement, it has heretofore been necessary to have a separate implement for each job.

It is therefore the principal object of my invention to avoid the need of utilizing two separate implements by the provision of a single implement having a wheel mounting and control arrangement so constructed that the wheels may be moved from one position to the other, as the type of job may require.

A further object is to provide a structure for the purpose so arranged that the change from one position to the other may be very quickly and easily effected.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
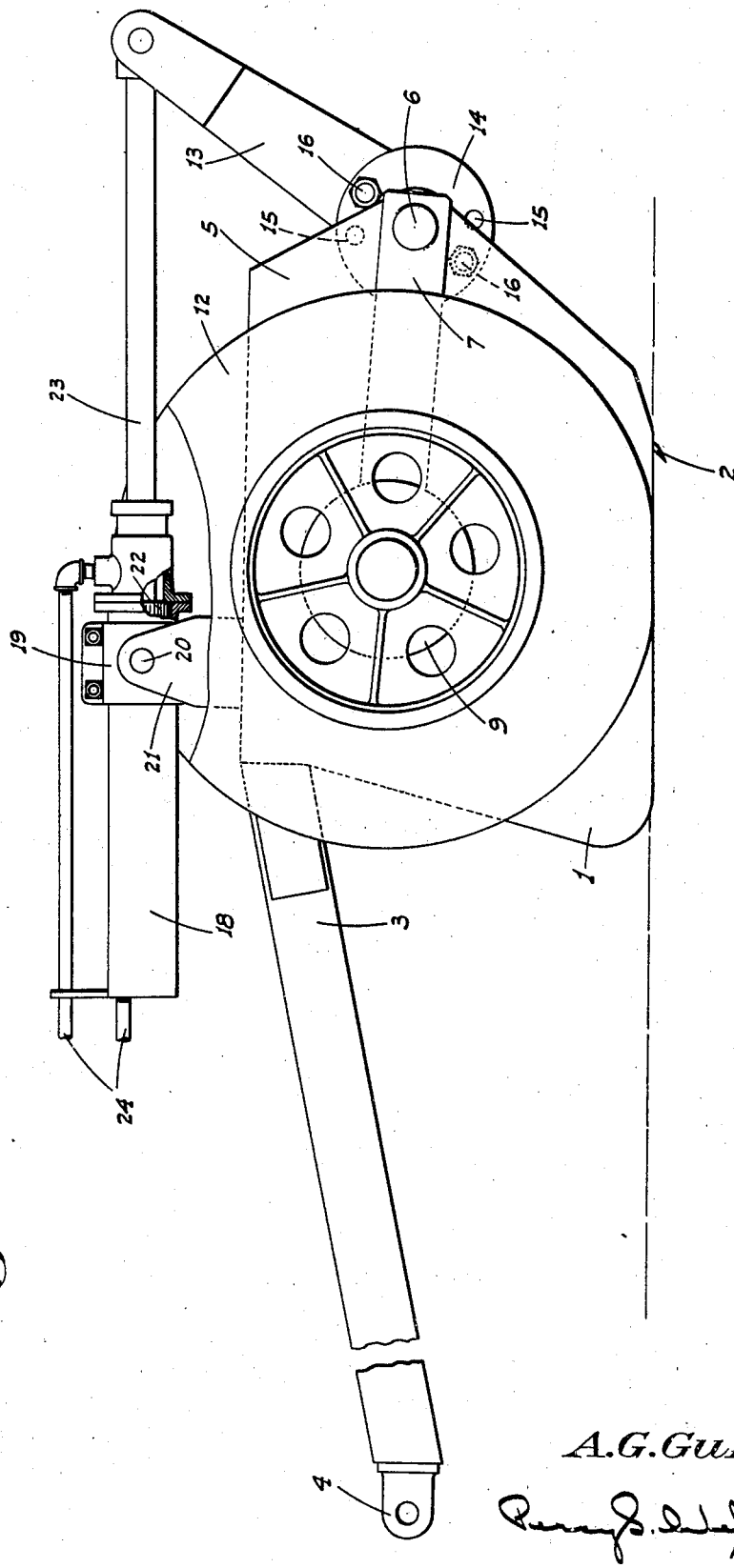
Figure 1 is a side elevation of my improved implement showing the wheels as set for check or border forming.

Referring now more particularly to the characters of reference on the drawings, the implement comprises a bowl 1 of the conventional form used in such implements, and having a transverse cutting blade 2 as usual. The dirt engaging unit is rigid with a centrally disposed longitudinal tongue beam 3, the forward portion of which slopes down to a termination in a swivel coupling element 4 adapted for supporting connection with a tractor. Webs 5 project rearwardly from the unit, and support a transverse shaft 6, located on a level somewhat above the center of depth of the unit.

Figure 2:
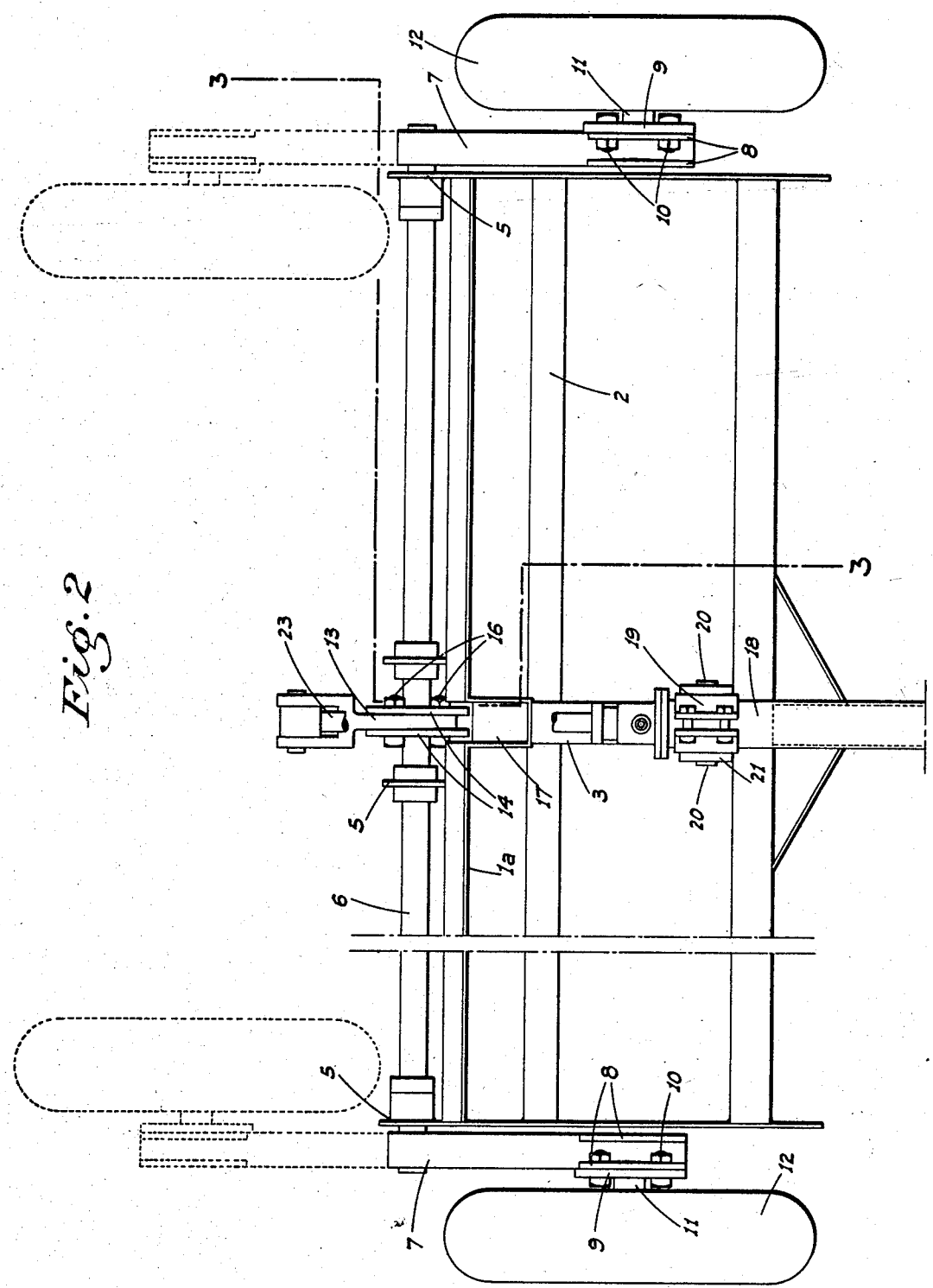
Figure 2 is a top plan of the same.

Radial arms 7 are rigid with the shaft at its ends, and lie in transverse planes just outside the sides of the unit. The arms at their outer ends are provided on opposite sides with enlarged disc-like flanges 8, the outer faces of which are adapted to alternately engage a disc 9 of corresponding size and to be removably secured thereagainst by bolts 10 (see Fig. 2). A stub axle 11 on which a wheel 12 is turnably mounted, projects from one face of each disc. In this manner it will be seen that the wheels may be selectively mounted on the arms so as to either lie laterally inward of the arms and the side edges of the blade, as indicated in dotted lines in Fig. 2, or laterally out from the arms and blade as shown in full lines in said figure.

When used for leveling purposes, the arms project rearwardly from the shaft and the wheels occupy said laterally inward position. When the implement is used for checking purposes, the arms are swung forwardly alongside the unit, since the corresponding position of the wheels relative to the unit provides for a very quick dumping action upon rotation of the shaft, as is then desirable.

Figure 3:
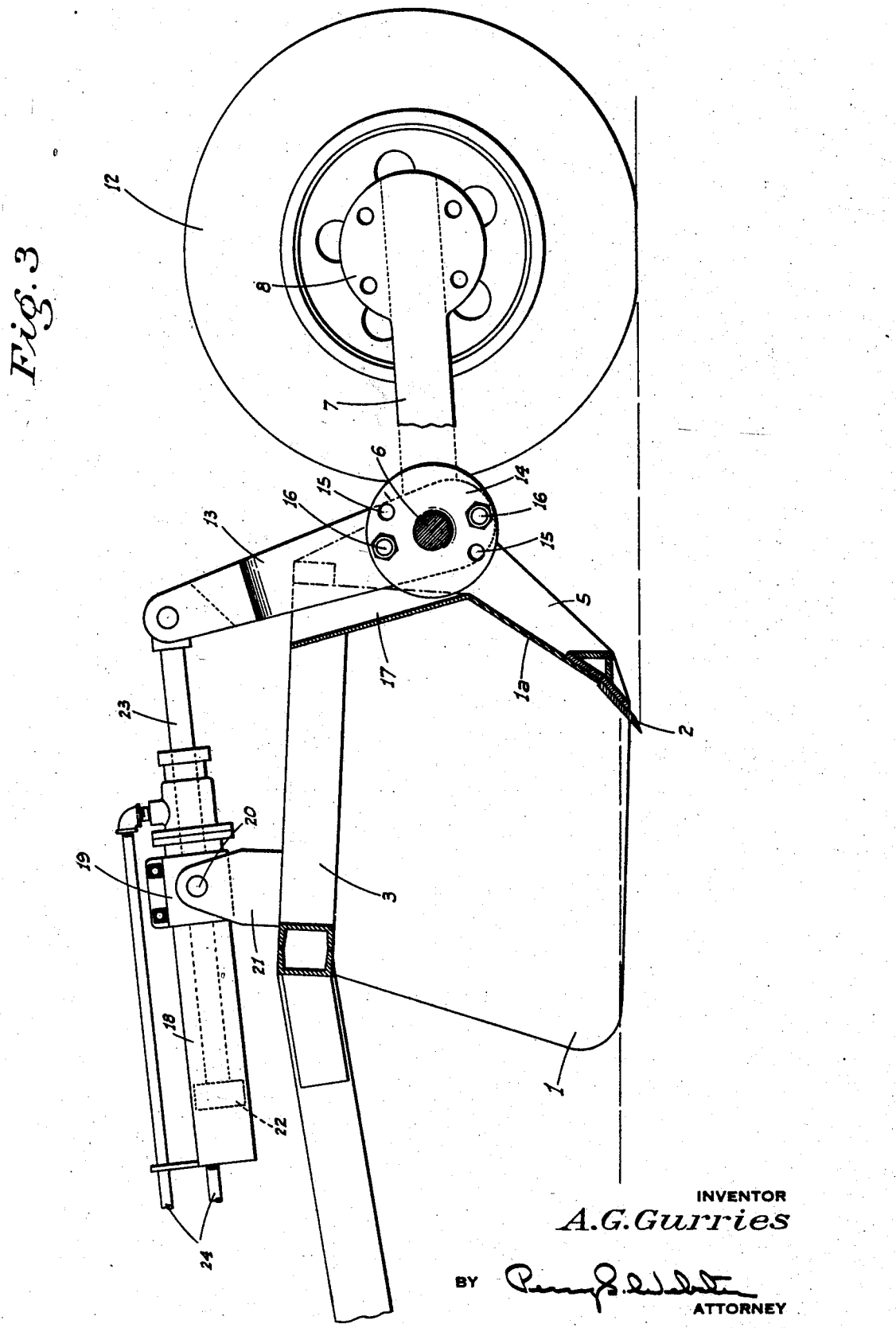
Figure 3 is a sectional elevation substantially on line 3—3 of Fig. 2, but showing the wheels as positioned for leveling purposes.

Control of the shaft, to effect rotation thereof in the opposite directions necessary with the arms in either position, is effected as follows:

Turnable on shaft 6 in line with the central beam 3 is an upstanding arm 13, flanked by flanges 14 rigid with the shaft. The flanges are provided with diametrally opposed pairs of holes 15, one pair at a time of which register with similar holes (not shown) in the arm 13, and through which removable holding bolts 16 are placed. One pair of flange holes is located so that when the shaft is turned to dispose the arms 7 rearwardly and the blade 2 is in a digging position as shown in Fig. 3, the arm 13 is disposed with a forward slope; the back plate 1a of the unit 1 being recessed as shown at 17 to receive the arm when in such position. Said arm 13 must then of course be swung rearwardly so as to relatively lower the arms 7 and raise the unit 1 for dumping.

The other pair of flange holes is located so that when the arms 7 are swung forwardly, and the blade is in digging position, the arm 13 is disposed with a rearward slope as shown in Fig. 1. From this position said arm must be swung forwardly to effect a relative lowering of the arms 7 and a raising of the unit 1 to a dumping position.

Such swinging of arm 13 is imparted thereto in either direction, depending on the normal position of arm 13 as above stated, by means of a hydraulic cylinder 18. This extends along beam 3 and is adjustably engaged by a clamping collar 19 having side trunnions 20 turnable in brackets 21 on beam 3. A piston 22 in the cylinder is connected to a piston rod 23 which projects from the rear end of the cylinder and is connected to arm 13. Supply pipes 24 lead to both ends of the cylinder so that fluid may be fed to the cylinder to move the piston one way or the other.

The cylinder is disposed so that when the blade is in digging position for leveling, the piston is adjacent the forward end of the cylinder, as indicated in Fig. 3. When the blade is in a digging position for checking, the piston is at the rear end of the cylinder as shown in Fig. 1; the digging depth being positively limited, as is then desirable, by shifting the cylinder in its supporting collar 19 so that the piston abuts against the rear end of the cylinder when the blade is set to cut at the desired depth.

To change the setting of the parts for one use or the other of the implement, it is only necessary to reverse the position of the wheels relative to arms 7, by removing and then replacing bolts 10. The bolts 16 are then withdrawn, and the arms 7 swung from one position to the other. The arm 13 is then turned to the corresponding position, and the bolts 16 passed through the other pair of holes 15 and said arm 13.

The wheels being ahead of the shaft 6 and the blade when in checking position, a great vertical movement of the blade is had with a relatively slight turning of the shaft, so that dumping may be effected very rapidly as is desirable when checking.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A ground working implement including a scraping blade, rearwardly projecting side arms pivoted at their forward end in permanently supported connection with the blade, a pair of wheels and exposed means to mount the wheels on the outer end of the arms laterally out from the same in transverse planes clear of the side edges of the blade and laterally in from said arms in transverse planes between the side edges of the blade, selectively.

2. A structure as in claim 1, in which said wheel mounting means comprises, for each wheel, a stub axle, a vertical disc from which the axle projects, plate elements on the outer end of the arm on opposite sides thereof and against either of which the disc is adapted to abut and bolts removably securing the disc and a plate element together.

3. A ground working implement including a scraping blade, rearwardly projecting side arms pivoted at their forward end in supported connection with the blade, said arms being disposed in transverse planes closely adjacent but laterally out from the side edges of the blade and a pair of wheels, one for each arm, and means to mount each wheel on opposite sides of an arm on the outer end thereof selectively.

4. A ground working implement comprising a scraping blade, a transverse shaft mounted above the blade in supported connection therewith, side arms disposed laterally out from the side edges of the blade rigid with and extending radially from the shaft, the shaft being turnable whereby the arms may extend rearwardly or forwardly of the shaft, a pair of wheels, one for each arm, and means to reversibly mount the wheels on the outer end of the arms on opposite sides thereof selectively.

5. A ground working implement comprising a scraping blade, a transverse shaft mounted above the blade in supported connection therewith, side arms disposed laterally out from the side edges of the blade mounted rigid with and extending radially from the shaft, the shaft being turnable whereby the arms may extend rearwardly or forwardly of the shaft, a pair of wheels, one for each arm, mounted on the outer end of the arms and means to control the rotation of the shaft when the arms are in either position; such control means including an arm projecting radially from the shaft, and means to secure said last named arm in different relative positions circumferentially of the shaft whereby said arm will upstand from the shaft irrespective of the setting of the side arms.

6. A ground working implement comprising a scraping blade, a transverse shaft mounted above the blade in supported connection therewith, side arms disposed laterally out from the side edges of the blade mounted rigid with and extending radially from the shaft, the shaft being turnable whereby the arms may extend rearwardly or forwardly of the shaft, a pair of wheels, one for each arm, mounted on the outer end of the arms and means to control the rotation of the shaft when the arms are in either position; such control means including an arm projecting radially from and initially turnable on the shaft, a hydraulic cylinder mounted on the implement and having a piston rod projecting therefrom and connected to said last named arm, means to supply fluid to both ends of the cylinder and means to releasably secure the last named arm on the shaft in such position relative to the side arms and to the cylinder that when the side arms are rearwardly disposed and the blade is in digging position, the piston rod is retracted in the cylinder and when the side arms are forwardly disposed and the blade is in digging position, the piston rod is advanced from the cylinder.

ALBERT G. GURRIES.